US012584759B2

(12) United States Patent
Hotta et al.

(10) Patent No.: US 12,584,759 B2
(45) Date of Patent: Mar. 24, 2026

(54) VEHICLE DISPLAY CONTROLLER, VEHICLE DISPLAY DEVICE, VEHICLE, VEHICLE DISPLAY CONTROL METHOD, AND NON-TRANSITORY COMPUTER READABLE STORAGE MEDIUM RECORDED WITH VEHICLE DISPLAY CONTROL PROGRAM

(71) Applicant: TOYOTA JIDOSHA KABUSHIKI KAISHA, Toyota (JP)

(72) Inventors: Norihisa Hotta, Nagoya (JP); Toshinori Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 325 days.

(21) Appl. No.: 18/144,970

(22) Filed: May 9, 2023

(65) Prior Publication Data

US 2024/0003701 A1    Jan. 4, 2024

(30) Foreign Application Priority Data

Jul. 4, 2022    (JP) ................................. 2022-108037

(51) Int. Cl.
*G01C 21/36*          (2006.01)

(52) U.S. Cl.
CPC ....... *G01C 21/365* (2013.01); *G01C 21/3632* (2013.01)

(58) Field of Classification Search
CPC .......................... G01C 21/365; G01C 21/3632
USPC ........................................................ 701/431
See application file for complete search history.

(56) References Cited

U.S. PATENT DOCUMENTS

| | | | | |
|---|---|---|---|---|
| 4,914,605 | A | * | 4/1990 | Loughmiller, Jr. .......................... G01C 21/3673 345/649 |
| 5,031,104 | A | * | 7/1991 | Ikeda .................... G01C 21/367 701/428 |
| 5,796,613 | A | * | 8/1998 | Kato ...................... G01C 21/28 701/472 |
| 9,322,665 | B2 | * | 4/2016 | Blumenberg ........ G01C 21/367 |
| 2004/0044477 | A1 | * | 3/2004 | Jung ....................... G01S 19/49 702/5 |

(Continued)

FOREIGN PATENT DOCUMENTS

| | | | | |
|---|---|---|---|---|
| JP | 2014215743 | A | * | 11/2014 ............... G08G 1/09 |
| JP | 2017-076175 | A | | 4/2017 |
| JP | 2021-133874 | A | | 9/2021 |

OTHER PUBLICATIONS

Navdy, Navdy OS 1.3—Feature Updates to Navigation, Dash, Messaging, Menus and Languages, Aug. 8, 2017. https://www.youtube.com/watch?v=MjP3otIIN_1 (Year: 2017).*

(Continued)

*Primary Examiner* — Matthias S Weisfeld
*Assistant Examiner* — Hyang Ahn
(74) *Attorney, Agent, or Firm* — OLIFF PLC.

(57) ABSTRACT

A vehicle display that is configured to: acquire a position of a vehicle, via a sensor; correct a positional relationship of a vehicle on a pre-generated map to an actual positional relationship of the vehicle as derived from the acquired position of the vehicle; and based on a result of correction, cause display of a direction image indicating a heading direction of the vehicle at a display area provided at a windshield glass in front of an occupant.

7 Claims, 11 Drawing Sheets

(56)  References Cited

U.S. PATENT DOCUMENTS

2009/0125234 A1*  5/2009  Geelen ............... G01C 21/3647
                                                      701/533
2010/0161208 A1*  6/2010  Akita .................. G08G 1/0969
                                                      701/533
2018/0156627 A1*  6/2018  Arita .................... G01C 21/365
2020/0166344 A1*  5/2020  Knutson ............. B60C 23/0488
2022/0163680 A1*  5/2022  Kato ..................... G01S 19/393
2022/0388395 A1*  12/2022  Kim ....................... B60K 35/81

OTHER PUBLICATIONS

Navdy, "Navdy OS 1.3—Feature Updates to Navigation, Dash, Messaging, Menus and Languages", Aug. 8, 2017. https://www.youtube.com/watch?v=MjP3otIIN_I (Year: 2017).*

* cited by examiner

NORTH

LINK DIRECTION
(DIRECTION FROM N2 TO N3)

N3

A

N2

EGO VEHICLE HEADING DIRECTION
(DIRECTION FROM P1 TO P2)

VEHICLE DISPLAY CONTROLLER, VEHICLE DISPLAY DEVICE, VEHICLE, VEHICLE DISPLAY CONTROL METHOD, AND NON-TRANSITORY COMPUTER READABLE STORAGE MEDIUM RECORDED WITH VEHICLE DISPLAY CONTROL PROGRAM

CROSS-REFERENCE TO RELATED APPLICATION

This application is based on and claims priority under 35 USC 119 from Japanese Patent Application No. 2022-108037 filed on Jul. 4, 2022, the disclosure of which is incorporated by reference herein.

BACKGROUND

Technical Field

The present disclosure relates to a vehicle display controller, a vehicle display device, a vehicle, a vehicle display control method, and a non-transitory computer readable storage medium recorded with a vehicle display control program.

Related Art

A vehicle display device disclosed in Japanese Patent Application Laid-Open (JP-A) No. 2017-076175 performs displays plural direction guidance images, which are images to guide a heading direction a vehicle should proceed in, by displaying the direction guidance images along the heading direction in a display area so as to be overlaid on a road ahead in the heading direction of the vehicle. In such a vehicle display device, a decision is made to display the direction guidance images on the display area at a vehicle width direction standard spacing using the vehicle width direction of the vehicle as a datum in cases in which a curvature of a road has exceeded a specific value, and the plural direction guidance images are displayed on the display area based on the decided vehicle with direction standard spacing.

In technology such as that of JP-A No. 2017-076175, there is a need to recognize a facing direction of the vehicle when displaying the images for guiding the heading direction. The vehicle facing direction can be found using results of detection by various sensors provided to the vehicle, such as a yaw rate sensor and a gyro sensor or the like.

However, there is still room for improvement because sometimes an angle of the direction image for display on the vehicle route is misaligned from the actual route of the vehicle when there is instability in output values of the sensors.

SUMMARY

An aspect of the present disclosure is a vehicle display controller that includes: a memory; and a processor coupled to the memory, the processor being configured to: acquire a position of a vehicle, via a sensor; correct a positional relationship of a vehicle on a pre-generated map to an actual positional relationship of the vehicle as derived from the acquired position of the vehicle; and based on a result of correction, cause display of a direction image indicating a heading direction of the vehicle at a display area provided at a windshield glass in front of an occupant.

DETAILED DESCRIPTION

Figure 1:
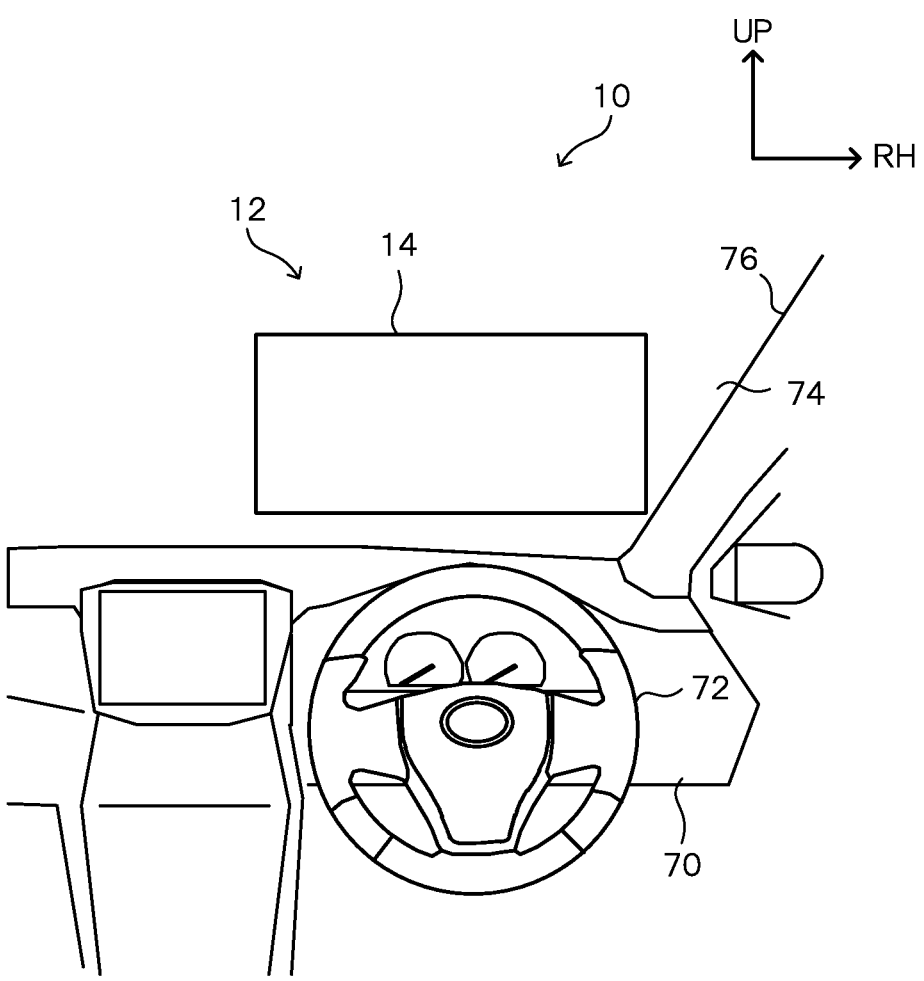
FIG. 1 is a diagram illustrating a schematic configuration of a vehicle display device according to an exemplary embodiment.

Detailed explanation follows regarding an example of an exemplary embodiment of the present disclosure, with reference to the drawings. FIG. 1 is a diagram illustrating a schematic configuration of a vehicle display device according to the present exemplary embodiment. Note that an arrow UP in FIG. 1 indicates an upper side in a vehicle height direction, and an arrow RH in FIG. 1 indicates a right side in a vehicle width direction. References to the height direction and the left and right directions in the following description mean up-down in the vehicle height direction and left and right in the vehicle width direction.

As illustrated in FIG. 1, an instrument panel 70 is provided at a front section inside a vehicle cabin of a vehicle 10. The instrument panel 70 extends along the vehicle width direction, and a steering wheel 72 is provided at a vehicle right side of the instrument panel 70. Namely, the present exemplary embodiment is, as an example, a right hand drive vehicle with the steering wheel 72 provided on the right side, and with a driver's seat installed on the vehicle right side.

A windshield glass 74 is provided at a front end portion of the instrument panel 70. The windshield glass 74 extends along the vehicle height direction and the vehicle width direction so as to partition between the vehicle interior and the vehicle exterior.

A vehicle right side edge of the windshield glass 74 is fixed to a vehicle right side front pillar 76. The front pillar 76 extends along the vehicle height direction, and the windshield glass 74 is fixed to the vehicle width direction inside edge of the front pillar 76. Note that a vehicle left side edge of the windshield glass 74 is fixed to a vehicle left side front pillar.

A display area 14 is provided to the windshield glass 74 for displaying images in front of an occupant. The display area 14 serves as a projection surface onto which images are projected by a display section 18 (see FIG. 2). Namely, the display section 18 is a head-up display device provide at the vehicle front side of the instrument panel 70. The display section 18 serving as this head-up display device is configured so as to project images onto the display area 14 of the windshield glass 74.

Figure 2:
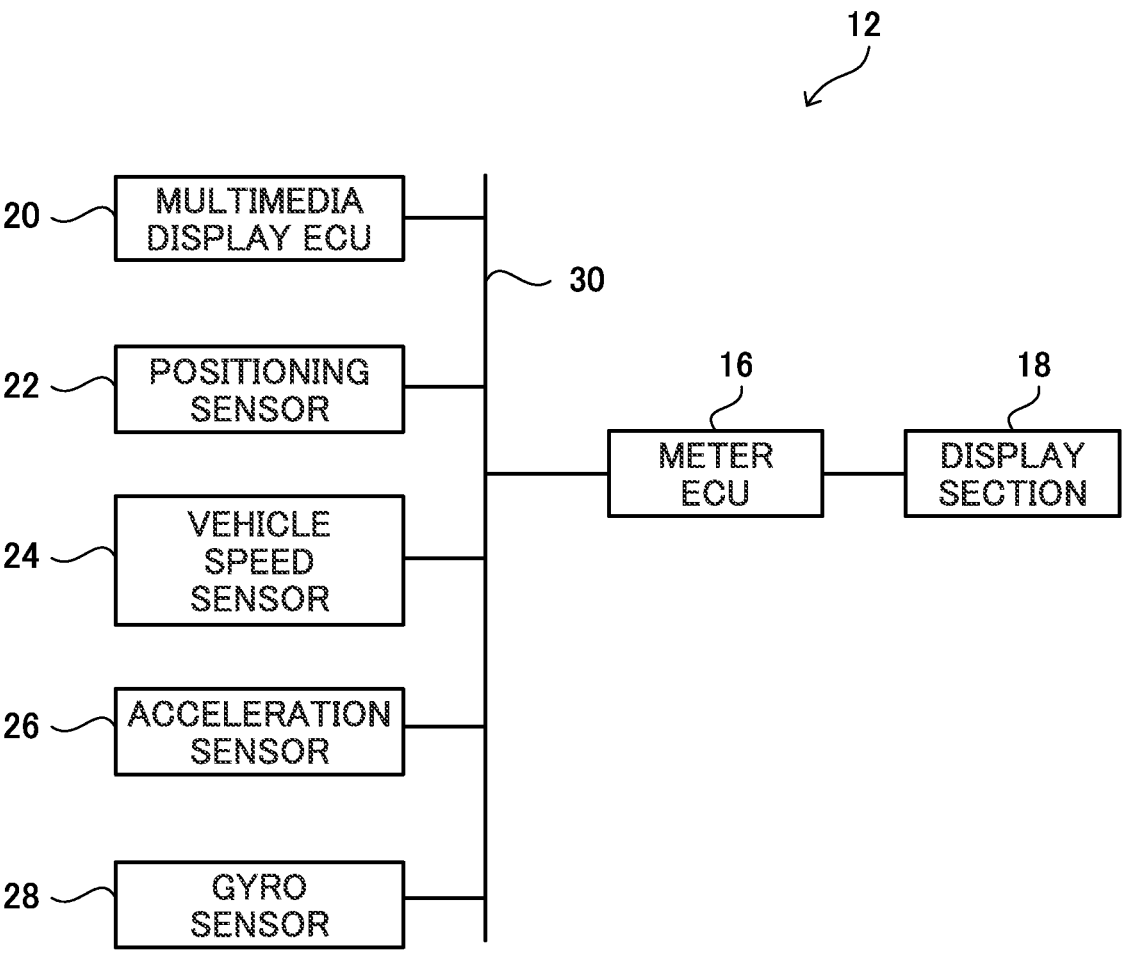
FIG. 2 is a block diagram illustrating a configuration of a control system of a vehicle display device according to the present exemplary embodiment.

Description follows regarding a configuration of a control system of a vehicle display device 12 according to the present exemplary embodiment. FIG. 2 is a block diagram illustrating a configuration of a control system of the vehicle display device 12 according to the present exemplary embodiment.

The vehicle display device 12 according to the present exemplary embodiment includes a meter electronic control unit (ECU) 16, a positioning sensor 22, a vehicle speed sensor 24, an acceleration sensor 26, a gyro sensor 28, and a multimedia display ECU 20, with these being respectively connected to a vehicle network 30.

The display section 18 is connected to the meter ECU 16 and the meter ECU 16 controls the display section 18 so as to display images on the display area 14.

The positioning sensor 22 performs positioning of the vehicle 10 by, for example, receiving a global navigation satellite system (GNSS) signal containing time stamp information from plural GNSS satellites.

The vehicle speed sensor 24 detects the vehicle speed, the acceleration sensor 26 detects acceleration occurring to the vehicle 10, and the gyro sensor 28 detects changes such as rotation or direction changes of the vehicle 10 as angular velocities. Note that a yaw rate sensor may be applied instead of the gyro sensor 28, and a configuration including an additional yaw rate sensor may also be adopted.

The multimedia display ECU 20 functions as a navigation device that performs display of guidance to a pre-set destination based on detection results of each sensor, such as the positioning sensor 22, the vehicle speed sensor 24, the acceleration sensor 26, and the gyro sensor 28. Based on the detection results of the sensors, for example, the multimedia display ECU 20 finds a relative location of the vehicle 10, and performs processing such as map matching thereof onto a pre-generated map.

Figure 3:
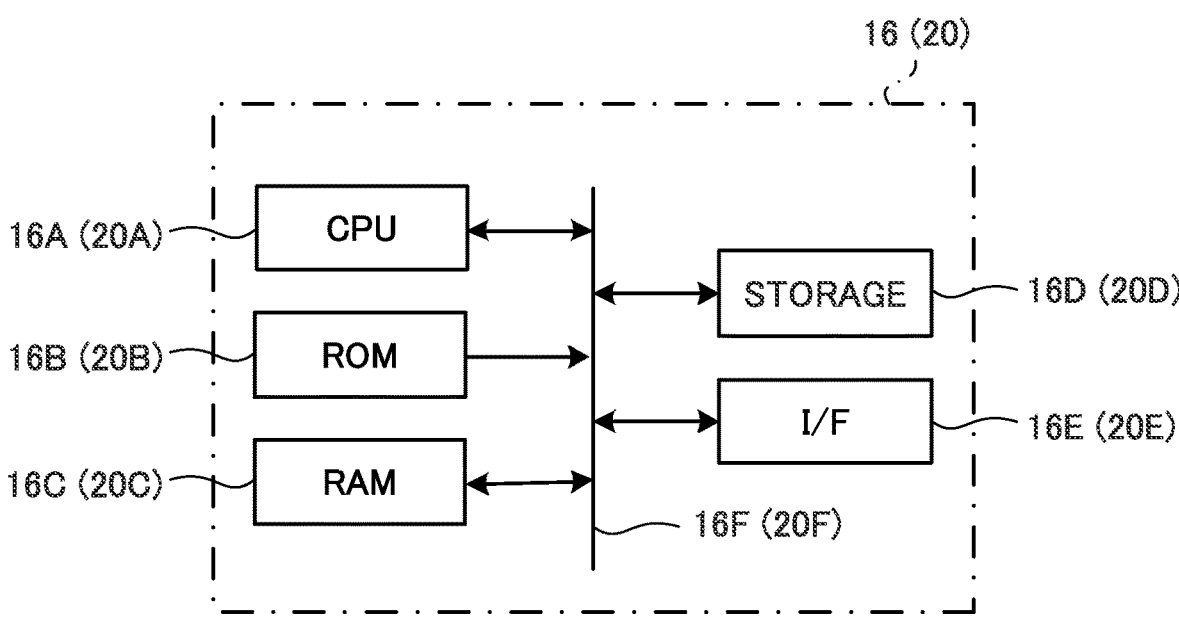
FIG. 3 is a block diagram illustrating a configuration of relevant portions of control systems of a meter ECU and a multimedia display ECU in a vehicle display device according to the present exemplary embodiment.

FIG. 3 is a block diagram illustrating a configuration of relevant portions of control systems of the meter ECU 16 and the multimedia display ECU 20 in the vehicle display device 12 according to the present exemplary embodiment. Note that the meter ECU 16 and the multimedia display ECU 20 are basically configured by a general microcomputer, and so in the following description the meter ECU 16 will be taken as representative thereof.

The meter ECU 16 is configured by a general microcomputer including sections such as a central processing unit (CPU) 16A serving as an example of a hardware processor, read only memory (ROM) 16B that is a non-transitory recording medium serving as an example of memory, random access memory (RAM) 16C, storage 16D, an interface (I/F) 16E, and a bus 16F.

The CPU 16A controls the device operation overall by loading and executing various programs. The ROM 16B is pre-stored with various control programs and various data.

The RAM 16C is employed by the CPU 16A as a work area and the like when executing various programs. The storage 16D is configured by various types of storage section, such as a hard disk drive (HDD), solid state drive (SSD), or flash memory, and is stored with various data, an application program, and the like. The I/F 16E is connectable to the vehicle network 30, and sends/receives various data to/from other ECUs connected to the vehicle network 30, such as the meter ECU 16. The above sections of the meter ECU 16 are electrically connected together by the bus 16F.

Figure 4:
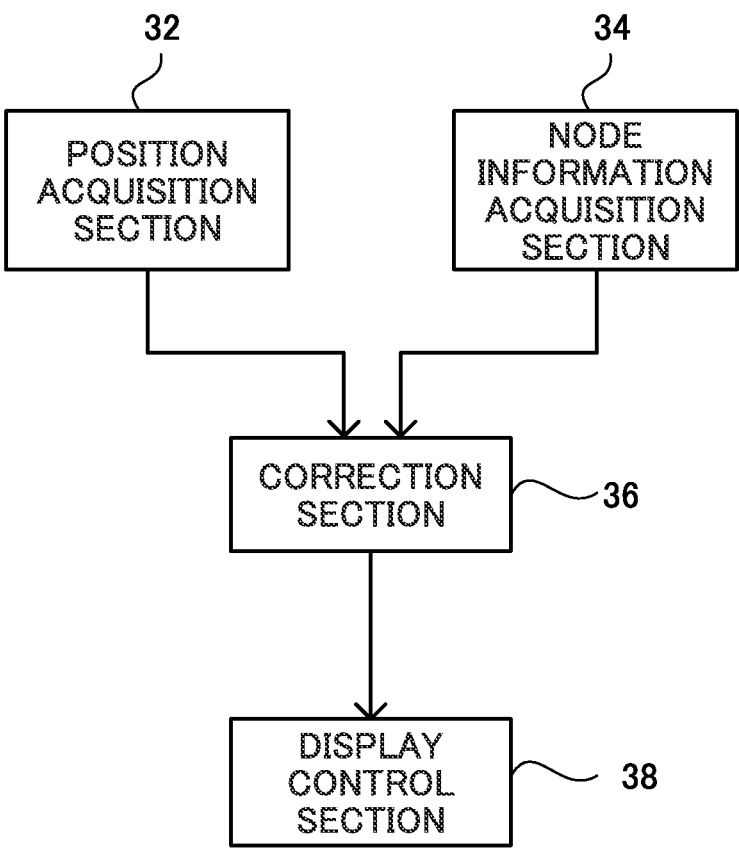
FIG. 4 is a functional block diagram illustrating a functional configuration of a meter ECU.

Next, description follows regarding a functional configuration of the CPU 16A of the meter ECU 16 that functions by loading and executing a program stored on the ROM 16B. FIG. 4 is a functional block diagram illustrating a functional configuration of the meter ECU 16.

The meter ECU 16 includes functions of a position acquisition section 32, a node information acquisition section 34, a correction section 36, and a display control section 38.

The position acquisition section 32 acquires a positioning result of the positioning sensor 22 at the current time and a positioning result of the positioning sensor 22 the previous time from the multimedia display ECU 20 and outputs these to the correction section 36.

The node information acquisition section 34 acquires node information about a guidance crossing and a one-previous node from the multimedia display ECU 20, and outputs the node information to the correction section 36.

The correction section 36 corrects a positional relationship of the vehicle 10 on a pre-generated map to an actual positional relationship of the vehicle 10. For example, the correction section 36 corrects a virtual relative relationship between a virtual path of travel of the vehicle on the map and a virtual heading direction of the vehicle on the map, by correcting to an actual relative relationship between a true travel path on which the vehicle 10 is actually traveling and a true heading direction of the vehicle 10. Specifically, to correct the virtual relative relationship the correction section 36 compares the heading direction of the vehicle 10 found from positions of the vehicle 10 as acquired by the position acquisition section 32 against an extension direction of a virtual line connecting together shape points on the map.

Figure 5:
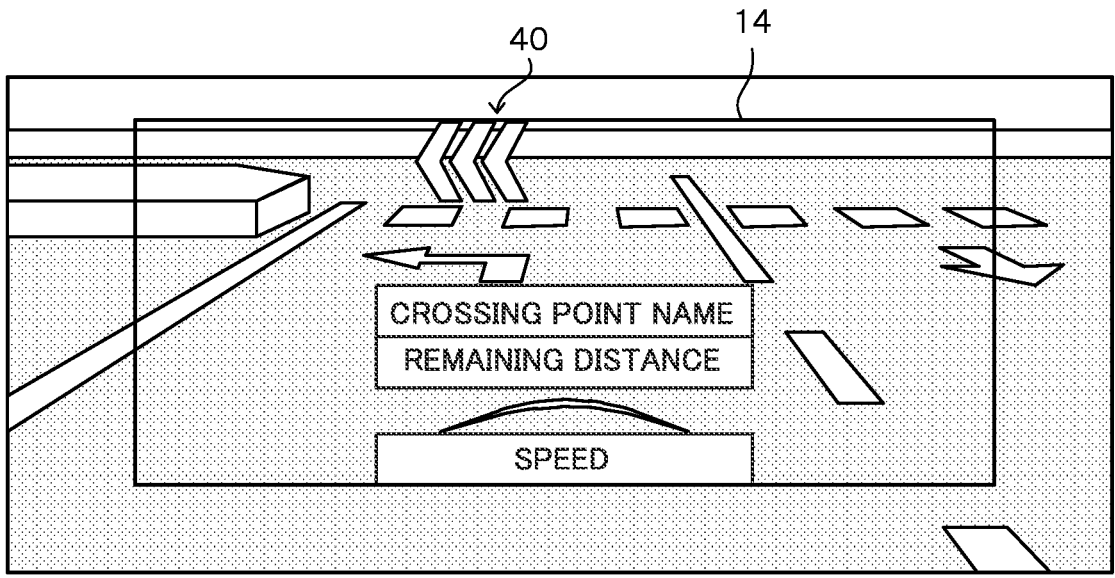
FIG. 5 is a diagram illustrating an example of an arrow image indicating a vehicle heading direction displayed on a display area.

Based on the correction result of the correction section 36, the display control section 38 controls the display section 18 so as to display an arrow image 40, serving as a direction image indicating the heading direction of the vehicle 10 for display on the display area 14, as illustrated in FIG. 5. Namely, the arrow image 40 is displayed overlaid on the actual crossing point, and so this facilitates recognition of both a route change position and a route change direction.

Figure 6:
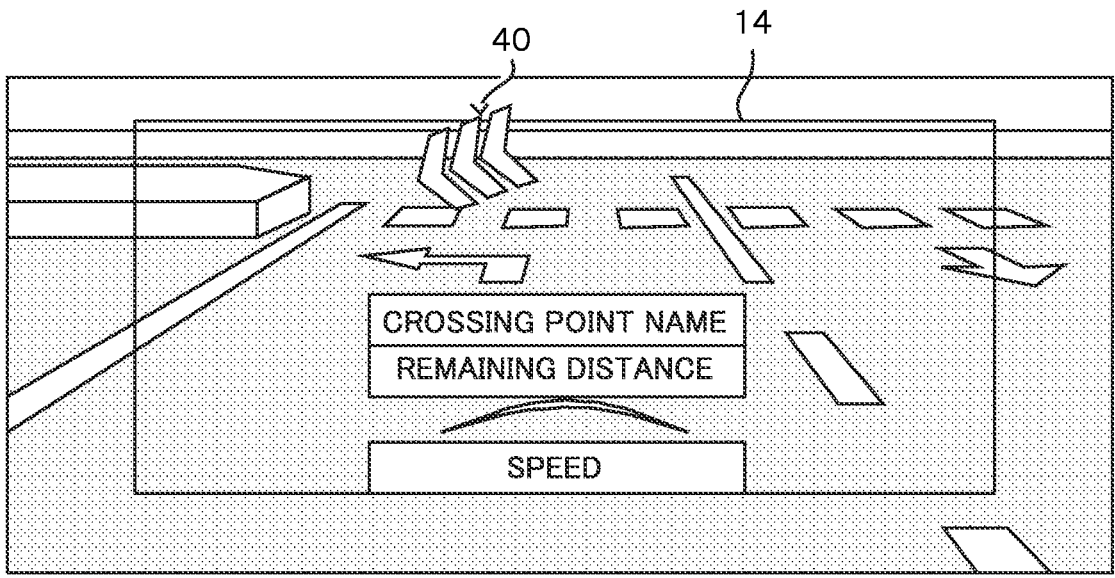
FIG. 6 is a diagram illustrating an example of misalignment of a facing direction of an arrow image with respect to an actual facing direction at a crossing point.

However, as illustrated in FIG. 5, when displaying the arrow image 40 serving as the direction image indicating the heading direction, the arrow image 40 is displayed on the display area 14 so as to indicate a direction derived from the virtual path on the map at the route change position. When displaying the arrow image 40, unless display is aligned with the actual facing direction of the vehicle 10, sometimes there would be a misalignment of the facing direction of the arrow image 40 with respect to the actual direction toward the crossing point, as illustrated in FIG. 6.

To address this issue, in the present exemplary embodiment the correction section 36 is configured so as to correct the positional relationship of the vehicle 10 on the pre-generated map to the actual positional relationship of the vehicle 10. This thereby enables misalignment of the facing direction of the arrow image 40 with respect to the actual heading direction to be suppressed from occurring.

Figure 7:
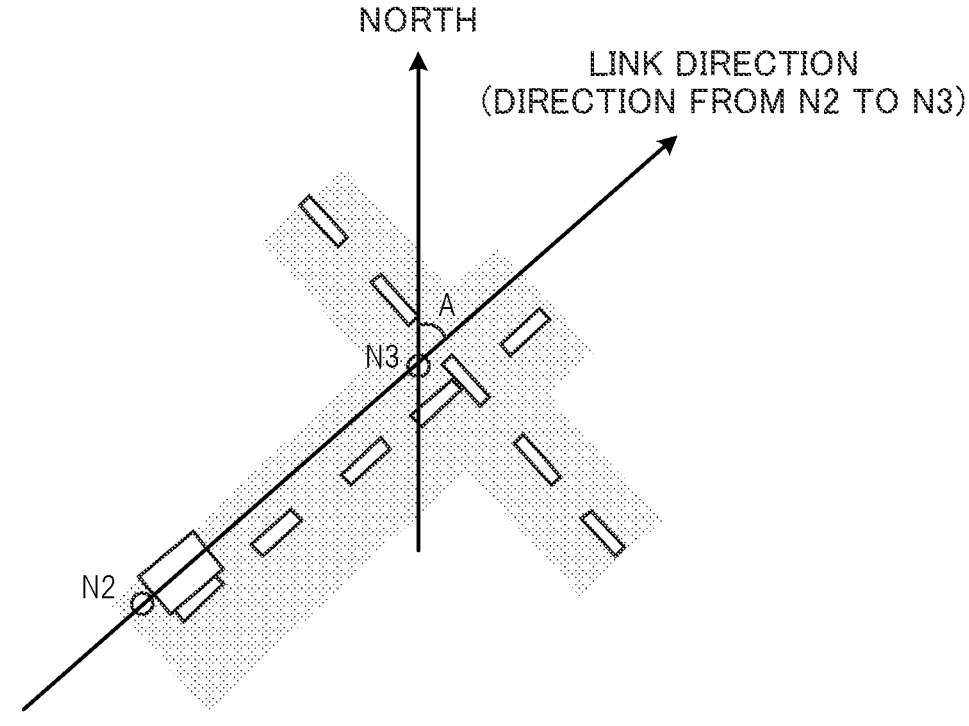
FIG. 7 is a diagram to explain computation of an angle of a virtual heading direction of a vehicle on a map with respect to a datum of north.
Figure 8:
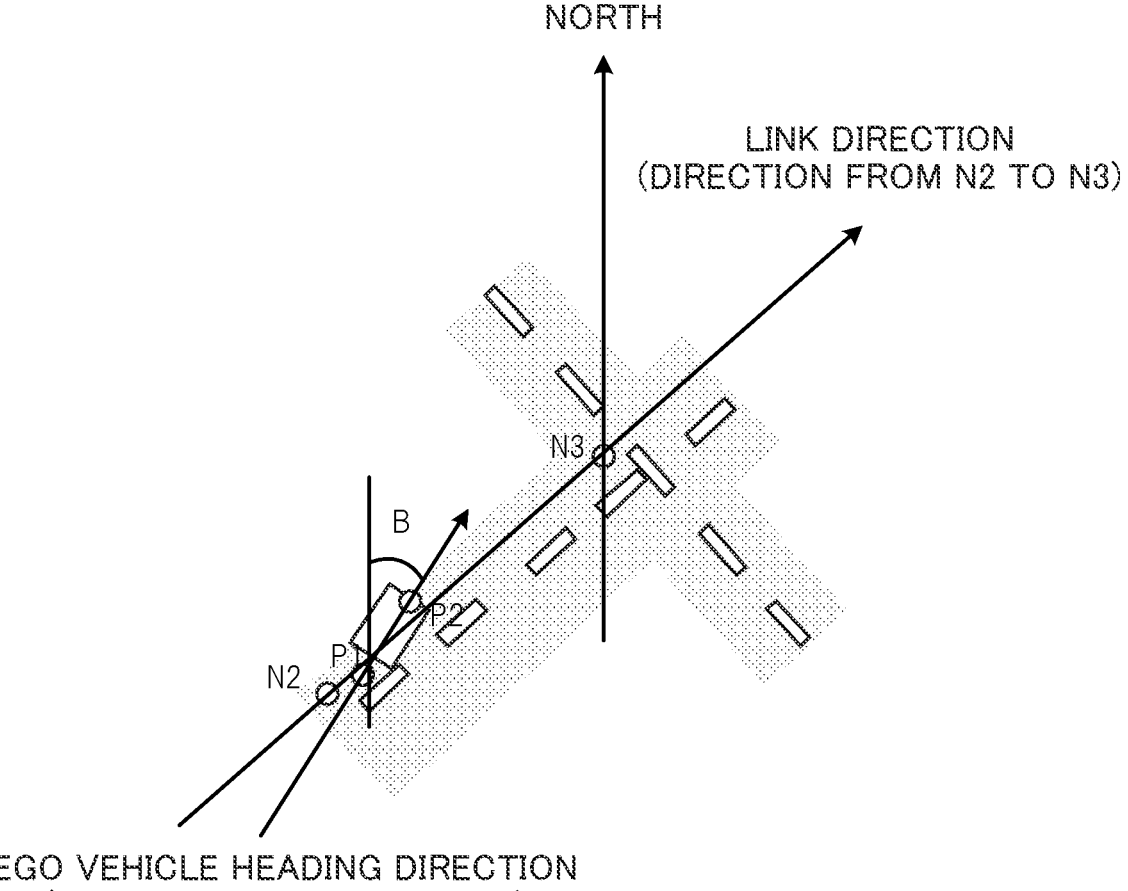
FIG. 8 is a diagram to explain computation of an actual angle of a vehicle heading direction with respect to a datum of north.
Figure 9:
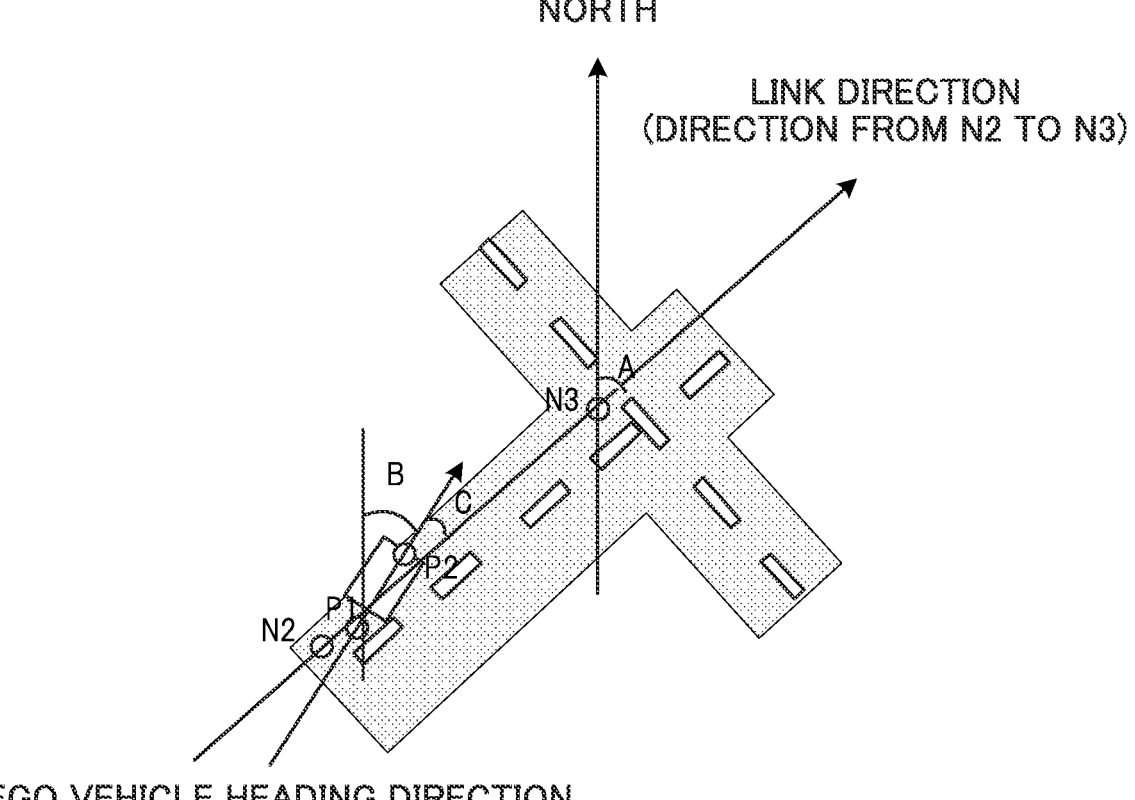
FIG. 9 is a diagram to explain computation of an angle of a vehicle with respect to a heading direction of a traveling vehicle as a datum.

Detailed explanation follows regarding such correction by the correction section 36, with reference to FIG. 7 to FIG. 9. FIG. 7 is a diagram to explain computation of an angle of a virtual heading direction of the vehicle 10 on a map with respect to a datum of north. FIG. 8 is a diagram to explain computation of an angle of an actual heading direction of the vehicle 10 with respect to a datum of north. FIG. 9 is a diagram to explain computation of an angle of the vehicle 10 with respect to a heading direction of the travelling vehicle 10 as a datum.

First the correction section 36 finds an approach angle of an ego vehicle to a guidance crossing. Specifically as illustrated in FIG. 7, the correction section 36 uses node information for the guidance crossing and for a one-previous node serving as shape points to compute an ego vehicle approach angle A to the guidance crossing with respect to north. Namely, the correction section 36 finds the virtual heading direction on the map, and computes the angle A with respect a datum of north. In the example of FIG. 7, the correction section 36 computes the angle A of an extension direction of a virtual line connecting a guidance crossing node N3 to a one-previous node N2 with respect to the datum of north (the link direction in FIG. 7). Note that nodes serving as shape points are expressed by points with latitude and longitude etc. along a road or the like on the map. Sometimes the extension direction between nodes will be referred to as a link direction.

The correction section 36 finds an angle of the ego vehicle with respect to the datum of north. Specifically, as illustrated in FIG. 8, the correction section 36 uses the latitude and longitude at the current time and at the previous time of performing matching to compute an angle B of the ego vehicle position with respect to north. Namely, the correction section 36 employs the detection results of the positioning sensor 22 to find the heading direction of the ego vehicle and to compute the angle B with respect to the datum of north. Note that the angle B is only updated when both the vehicle speed is a predetermined vehicle speed S (km/h) or greater and a distance between the ego vehicle position and the guidance crossing (node N3) is a predetermined distance D (m) of shorter.

As illustrated in FIG. 9, the correction section 36 uses the angle A and the angle B found using the node information of the guidance crossing and the latitude and longitude at the previous matching to compute an angle C of the ego vehicle for correction. More specifically computation is performed according to: angle C of the ego vehicle using a datum of the currently travelled link direction=the ego vehicle approach angle A to the guidance crossing−the angle B of the ego vehicle with respect to north. The correction section 36 thereby compares the heading direction of the vehicle 10 against the extension direction of the virtual line connecting nodes on the map (shape points) together, and computes a correction value for correcting the virtual relative relationship between the virtual path travelled by the vehicle 10 on the map and the virtual heading direction of the vehicle 10 on the map for correcting to the actual relative relationship between a true travel path actually travelled by the vehicle 10 and a true heading direction of the vehicle 10. Employing this computed correction value to correct the angle of the arrow image 40 when the display control section 38 is displaying the arrow image 40 enables the angle of the arrow image 40 to be suppressed from being misaligned at the actual route change position, such as a crossing point or the like.

Figure 10:
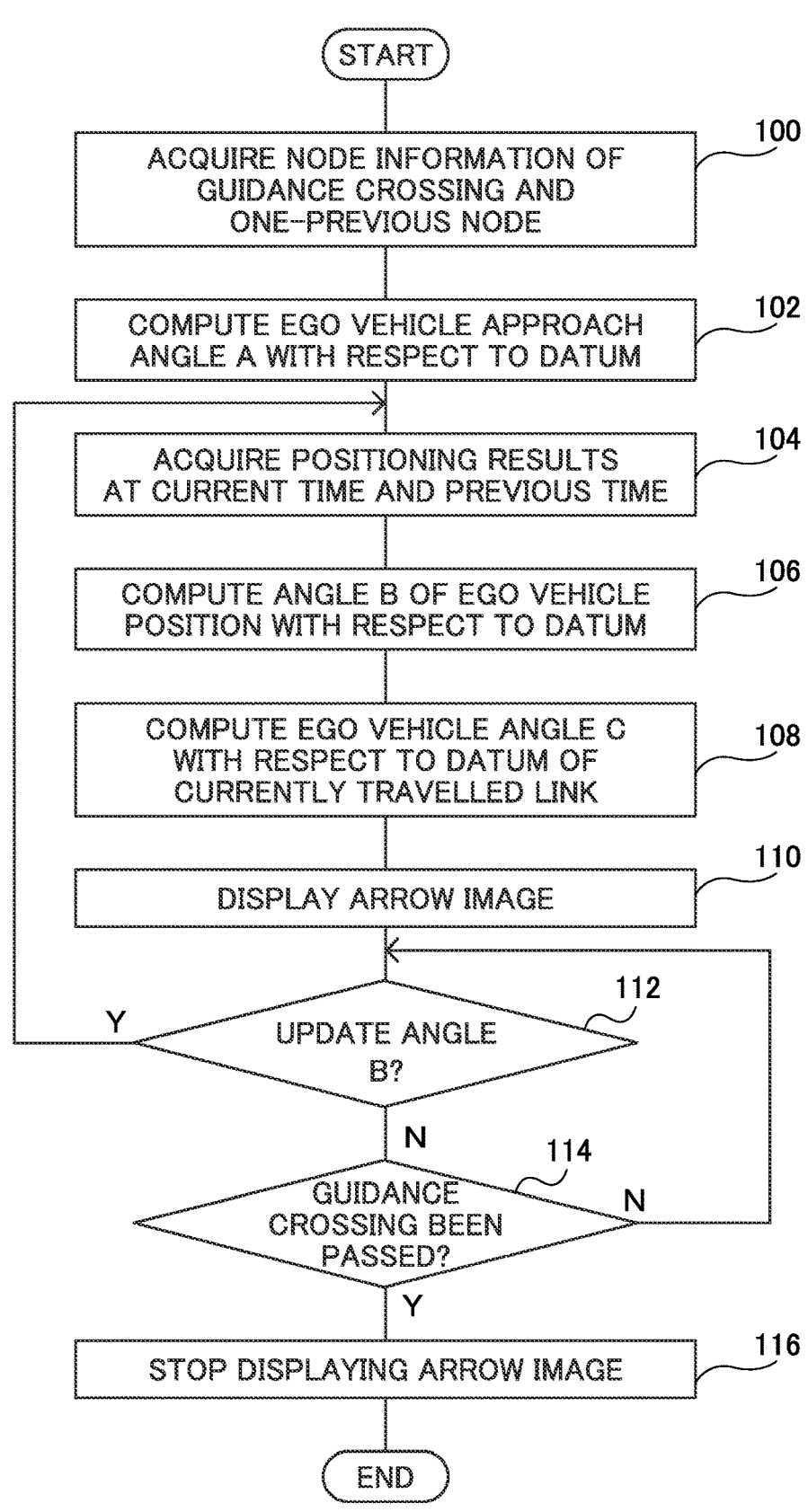
FIG. 10 is a flowchart illustrating an example of a flow of processing performed in a meter ECU of a vehicle display device according to the present exemplary embodiment.

Next, description follows regarding processing performed in the meter ECU 16 of the vehicle display device 12 according to the present exemplary embodiment configured as described above. FIG. 10 is a flowchart illustrating an example of a flow of positioning performed by the meter ECU 16 of the vehicle display device 12 according to the present exemplary embodiment. Note that the processing of FIG. 10 is, for example, started when a distance to a guidance crossing is a predetermined distance or shorter.

At step 100, the CPU 16A acquires node information about the guidance crossing and the one-previous node, and then processing transitions to step 102. Namely, the node information acquisition section 34 acquires the node information about the guidance crossing and the one-previous node from the multimedia display ECU 20.

At step 102, the CPU 16A computes the ego vehicle approach angle A with respect to the datum, and then processing transitions to step 104. Namely, as illustrated in FIG. 7, the correction section 36 computes the approach angle A of the vehicle 10 on the map with respect to north. For example in the example of FIG. 7, the angle A is computed for the extension direction of the virtual line connecting the guidance crossing node N3 and the one-previous node N2 (the link direction in FIG. 7), with respect to the datum of north.

At step 104, the CPU 16A acquires positioning results for the current time and previous time, and then processing transitions to step 106. Namely, the position acquisition section 32 acquires the current positioning result of the positioning sensor 22 and the previous positioning result of the positioning sensor 22 from the multimedia display ECU 20.

At step 106 the CPU 16A computes an angle B of the ego vehicle position with respect to the datum, and then processing transitions to step 108. Namely, as illustrated in FIG. 8, the correction section 36 employs the detection results of the positioning sensor 22 to find the heading direction of the ego vehicle, and computes the angle B with respect to the datum of north.

At step 108, the CPU 16A computes the angle C of the ego vehicle with the currently travelled link as the datum, then processing transitions to step 110. Namely, the correction section 36 computes the angle C of the ego vehicle as illustrated in FIG. 9 according to: angle C of the ego vehicle with direction of currently travelled link as a datum=the ego vehicle approach angle A to the guidance crossing−the ego vehicle angle B with respect to the datum of north.

At step 110, the CPU 16A displays the arrow image 40 on the display area 14, then processing transitions to step 112. Namely, the display control section 38 controls the display section 18 so as to display the arrow image 40 on the display area 14 as illustrated in FIG. 9. Correcting the arrow angle using the ego vehicle angle C as found at step 108 when the arrow image 40 is being displayed enables the angle of the arrow image 40 to be suppressed from being misaligned at the actual route change position, such as a crossing point or the like.

At step 112, the CPU 16A determines whether or not to update the angle B. This determination is performed by, for example, determination as to whether or not both the vehicle speed is the predetermined vehicle speed S (km/h) or greater and the distance between the ego vehicle position and the guidance crossing (node N3) the predetermined distance D (m) or shorter. Processing returns to step 104 and the above processing is repeatedly executed in cases in which this determination is affirmative, however processing transitions to step 114 in cases in which this determination is negative.

At step 114 the CPU 16A determines whether or not the guidance crossing has been passed. Processing returns to step 112 and the above processing is repeatedly executed in cases in which this determination is negative, however processing transitions to step 116 when this determination is affirmative.

At step 116, the CPU 16A stops display of the arrow image 40 being displayed on the display area 14 and then ends one cycle of processing.

Performing such processing enables computation by the correction section 36 of a correction value for correcting the virtual relative relationship between the virtual path being travelled by the vehicle 10 on the map and the virtual heading direction of the vehicle 10 on the map, by correction to the true relative relationship between the true travel path actually being travelled by the vehicle 10 and the true heading direction of the vehicle 10. The display control section 38 then employs the computed correction value to correct the angle of the arrow image 40 when displaying the arrow image 40, thereby enabling the angle of the arrow image 40 to be suppressed from being misaligned at the actual route change position, such as a crossing point or the like.

Figure 11:
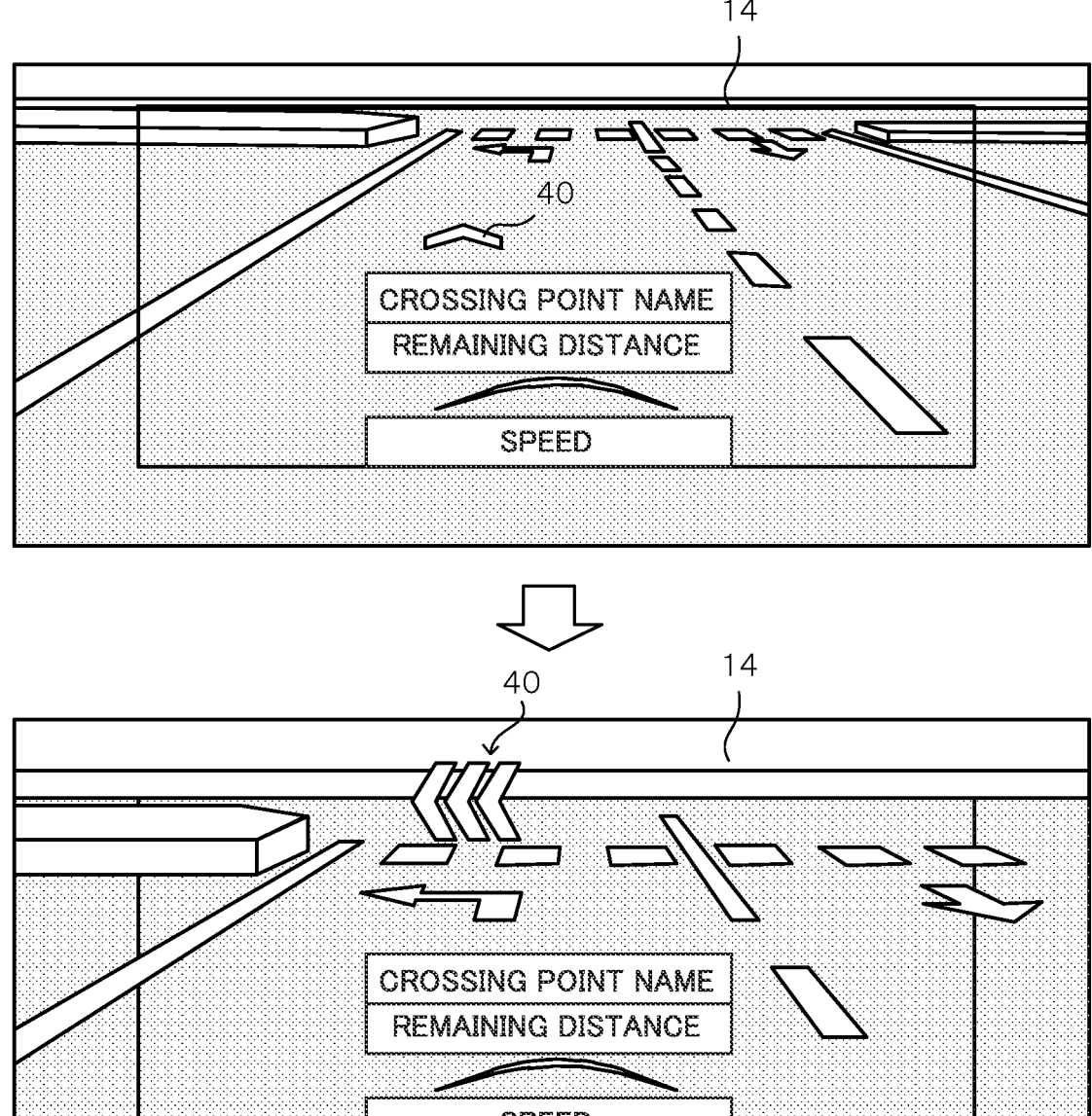
FIG. 11 is a diagram illustrating an example in which an arrow image pointing toward a route change position is displayed so as to move before then displaying an arrow image at a route change position after the route change position has become within an angle of view.

Note that although in the above exemplary embodiment an example has been described of display at the route change position when displaying the arrow image 40, there is no limitation thereto. For example, as illustrated in FIG. 11, a configuration may be adopted in which, after the arrow image 40 has been displayed so as to move toward the route change position, the arrow image 40 is displayed at the route change position after the route change position detected from an image captured ahead of the vehicle has become within an angle of view.

Moreover, although the processing performed by the vehicle display device 12 in the above exemplary embodiments has been described as being software processing performed by executing a program, there is no limitation thereto. For example, the processing may be performed by hardware such as a graphics processing unit (GPU), application specific integrated circuit (ASIC), field programmable gate array (FPGA), or the like. Alternatively the processing may be performed by a combination of both software and hardware. Moreover, in cases in which the processing is software processing, the program may be distributed stored on various types of non-transitory storage medium.

Moreover, the present disclosure is not limited by the above description, and obviously various modifications other than those described above may be implemented within a scope not departing from the spirit of the present disclosure.

In consideration of the above circumstances, an object of the present disclosure is to provide a vehicle display controller, a vehicle display device, a vehicle, a vehicle display control method, and a non-transitory computer readable storage medium recorded with a vehicle display control program that are each capable of suppressing misalignment of a direction image indicating a route of a vehicle.

Solution to Problem

A first aspect of the present disclosure is a vehicle display controller that includes: a memory; and a processor coupled to the memory, the processor being configured to: acquire a position of a vehicle, via a sensor; correct a positional relationship of a vehicle on a pre-generated map to an actual positional relationship of the vehicle as derived from the acquired position of the vehicle; and based on a result of correction, cause display of a direction image indicating a heading direction of the vehicle at a display area provided at a windshield glass in front of an occupant.

In the first aspect the position acquisition section acquires the position of the vehicle, and the correction section corrects the positional relationship of the vehicle on the pre-generated map to the actual positional relationship of the vehicle as found from the vehicle position as acquired by the position acquisition section.

In the display control section the direction image indicating the heading direction of the vehicle is displayed on the display area set in front of the occupant based on the correction result of the correction section. Displaying the direction image based on the correction result enables the direction image being displayed to be suppressed from being misaligned with respect to the actual route of the vehicle.

A second aspect of the present disclosure is the vehicle display controller of the first aspect, wherein the processor is configured to correct a virtual relative relationship between a virtual path on which the vehicle travels on the map and a virtual heading direction of the vehicle on the map by correcting to a true relative relationship between a true travel path on which the vehicle is actually traveling and a true heading direction of the vehicle.

In the second aspect the virtual relative relationship between the virtual path on which the vehicle travels on the map and the virtual heading direction of the vehicle on the map is corrected to the true relative relationship between the true travel path on which the vehicle is actually traveling and the true heading direction of the vehicle, thereby enabling misaligned with respect to the actual route to be suppressed from occurring when the direction image is displayed in front of the occupant.

A third aspect of the present disclosure is the vehicle display controller of the second aspect, wherein the processor is configured to compare an acquired vehicle heading direction against an extension direction of a virtual line connecting shape points on the map together, so as to correct the virtual relative relationship.

In the third aspect, the vehicle heading direction and the extension direction of the virtual line connecting the shape points on the map together are compared so as to enable the virtual relative relationship to be corrected.

A fourth aspect of the present disclosure is a vehicle display device that includes: the vehicle display controller of the first aspect; and a head-up display that displays the direction image at the display area, under control of the display controller.

The fourth aspect is able to provide a vehicle display device capable of suppressing misalignment from occurring in a direction image indicating a route of a vehicle.

A fifth aspect of the present disclosure is a vehicle comprising: the vehicle display controller of the first aspect; and a head-up display that displays the direction image at the display area, under control of the display controller.

The fifth aspect is able to provide a vehicle capable of suppressing misalignment from occurring in a direction image indicating a route of the vehicle.

A sixth aspect of the present disclosure is a vehicle display control method that includes: by a processor, acquiring a position of a vehicle, via a sensor; correcting a positional relationship of a vehicle on a pre-generated map to an actual positional relationship of the vehicle as derived from the vehicle position; and based on a result of correction, causing display of a direction image indicating a heading direction of the vehicle at a display area provided at a windshield glass in front of an occupant.

The sixth aspect enables provision of a vehicle display control method capable of suppressing misalignment from occurring in the direction image indicating the route of the vehicle.

A seventh aspect of the present disclosure is a non-transitory computer readable storage medium storing a vehicle display control program that causes a computer to execute processing, the processing comprising: acquiring a position of a vehicle, via a sensor; correcting a positional relationship of a vehicle on a pre-generated map to an actual positional relationship of the vehicle as derived from the vehicle position; and based on a result of correction, causing display of a direction image indicating a heading direction of the vehicle at a display area provided at a windshield glass in front of an occupant.

The seventh aspect enables provision of a non-transitory computer readable storage medium recorded with the vehicle display control program capable of suppressing misalignment from occurring in the direction image indicating the route of the vehicle.

The present disclosure as described above enables provision of a vehicle display controller, a vehicle display device, a vehicle, a vehicle display control method, and a non-transitory computer readable storage medium recorded with a vehicle display control program each capable of suppressing misalignment from occurring in a direction image indicating a route of a vehicle.

The invention claimed is:

1. A vehicle display controller comprising:
a memory; and
a processor coupled to the memory,
the processor being configured to:
    acquire a position of a vehicle, via a sensor;
    compute, based on a predefined reference direction, an angle of an actual heading direction of the vehicle derived from the acquired position with respect to the reference direction, and an angle of an extension direction of a virtual line connecting shape points on a pre-generated map with respect to the reference direction;
    based on the computed angles, calculate a correction value for correcting a virtual relative relationship between a virtual travel path on the map on which the vehicle travels and a virtual heading direction of the vehicle on the map, to a true relative relationship between a true travel path on which the vehicle actually travels and a true heading direction of the vehicle;
    correct a positional relationship of the vehicle on the map to an actual positional relationship of the vehicle based on the correction value and the acquired position; and
    based on a result of correction, display a direction image indicating a heading direction of the vehicle at a display area provided at a windshield glass in front of an occupant,
    wherein the processor is further configured to update the angle of the actual heading direction of the vehicle with respect to the reference direction, derived from the acquired position, and calculate the correction value when a vehicle speed is equal to or greater than a predetermined speed and a distance to a guidance intersection becomes equal to or less than a predetermined distance.

2. A vehicle display device comprising:
the vehicle display controller of claim 1; and
a head-up display that displays the direction image at the display area, under control of the display controller.

3. A vehicle comprising:
the vehicle display controller of claim 1; and
a head-up display that displays the direction image at the display area, under control of the display controller.

4. The vehicle display control device according to claim 1, wherein the processor is configured to, after displaying the direction image so as to move toward a route change position, display the direction image at the route change position when the route change position detected from a forward-captured image comes within an angle of view.

5. The vehicle display control device according to claim 1, wherein the correction value is calculated by subtracting the computed angle of the actual heading direction with respect to the reference direction from the computed angle of the extension direction with respect to the reference direction.

6. A vehicle display control method comprising:
by a processor,
    acquiring a position of a vehicle, via a sensor;
    computing, based on a predefined reference direction, an angle of an actual heading direction of the vehicle derived from the acquired position with respect to the reference direction, and an angle of an extension direction of a virtual line connecting shape points on a pre-generated map with respect to the reference direction;
    based on the computed angles, calculating a correction value for correcting a virtual relative relationship between a virtual travel path on the map on which the vehicle travels and a virtual heading direction of the vehicle on the map, to a true relative relationship between a true travel path on which the vehicle actually travels and a true heading direction of the vehicle;
    correcting a positional relationship of the vehicle on the map to an actual positional relationship of the vehicle based on the correction value and the acquired position; and
    based on a result of correction, displaying a direction image indicating a heading direction of the vehicle at a display area provided at a windshield glass in front of an occupant,
    wherein the vehicle display control method further includes, by the processor, updating the angle of the actual heading direction of the vehicle with respect to the reference direction, derived from the acquired position, and calculating the correction value when a vehicle speed is equal to or greater than a predetermined speed and a distance to a guidance intersection becomes equal to or less than a predetermined distance.

7. A non-transitory computer readable storage medium storing a vehicle display control program that causes a computer to execute processing, the processing comprising:
    acquiring a position of a vehicle, via a sensor;
    computing, based on a predefined reference direction, an angle of an actual heading direction of the vehicle derived from the acquired position with respect to the reference direction, and an angle of an extension direction of a virtual line connecting shape points on a pre-generated map with respect to the reference direction;

based on the computed angles, calculating a correction value for correcting a virtual relative relationship between a virtual travel path on the map on which the vehicle travels and a virtual heading direction of the vehicle on the map, to a true relative relationship between a true travel path on which the vehicle actually travels and a true heading direction of the vehicle;

correcting a positional relationship of the vehicle on the map to an actual positional relationship of the vehicle based on the correction value and the acquired position; and based on a result of correction, displaying a direction image indicating a heading direction of the vehicle at a display area provided at a windshield glass in front of an occupant, wherein the processing further includes updating the angle of the actual heading direction of the vehicle with respect to the reference direction, derived from the acquired position, and calculating the correction value when a vehicle speed is equal to or greater than a predetermined speed and a distance to a guidance intersection becomes equal to or less than a predetermined distance.

\* \* \* \* \*